United States Patent [19]
White

[11] Patent Number: 5,117,821
[45] Date of Patent: Jun. 2, 1992

[54] HUNTING MASK WITH BREATH ODOR CONTROL SYSTEM

[76] Inventor: George M. White, 584 Tooting La., Birmingham, Mich. 48009

[21] Appl. No.: 779,339

[22] Filed: Oct. 18, 1991

[51] Int. Cl.$^5$ .................. A62B 7/10; A62B 18/08; A62B 23/02

[52] U.S. Cl. .................. 128/206.15; 128/206.12; 128/207.12

[58] Field of Search .................. 128/200.24, 200.27, 128/205.25, 205.27, 206.12, 206.15, 206.21, 206.22, 206.28, 207.11, 207.12, 203.29, 206.27

[56] References Cited

U.S. PATENT DOCUMENTS

| | | | |
|---|---|---|---|
| 2,007,867 | 7/1935 | Le Duc | 128/206.12 |
| 2,296,150 | 9/1942 | Dockson et al. | 128/206.12 |
| 4,873,970 | 10/1989 | Freidank et al. | 128/207.12 |
| 5,036,842 | 8/1991 | van der Smissen et al. | 128/201.25 |

FOREIGN PATENT DOCUMENTS 8809205 12/1988 World Int. Prop. O. ...... 128/205.27

Primary Examiner—Edgar S. Burr
Assistant Examiner—Kimberly L. Asher
Attorney, Agent, or Firm—Lyon & Delevie

[57] ABSTRACT

A hunting mask for purifying the breath of a hunter comprises a face mask having a one-way air intake valve thereon, a tube for conducting a hunter's breath from the mask to an intake end of an air purification canister, and a one-way discharge valve at the discharge end of the canister for controlled passage of breath to the ambient atmosphere.

2 Claims, 1 Drawing Sheet

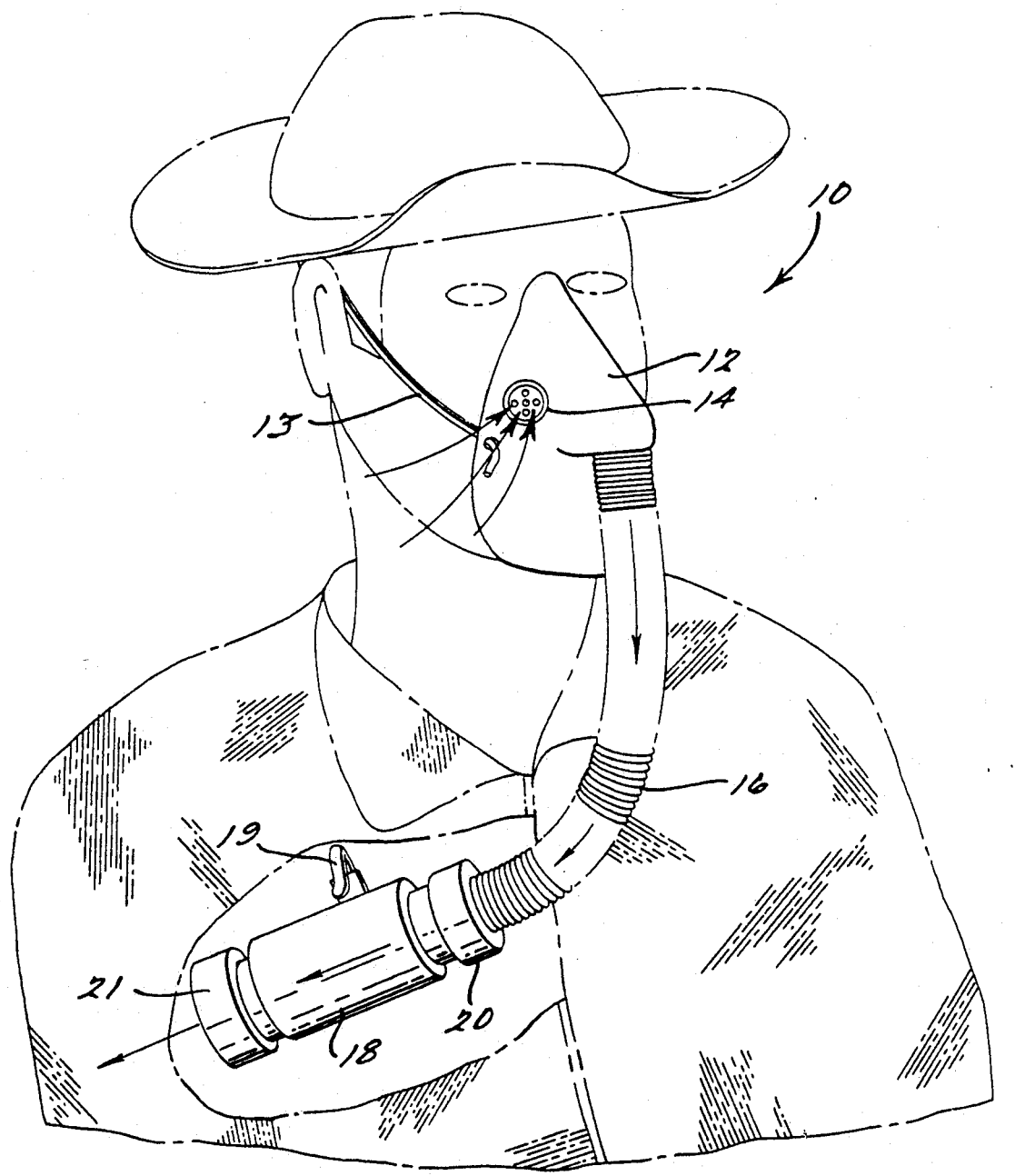

HUNTING MASK WITH BREATH ODOR CONTROL SYSTEM

BACKGROUND OF THE INVENTION

It is well known that an animal being hunted should be approached from the downwind side of the animal due to an animal's keen sense of smell. Heretofore, the popular understanding of the problem has been that the animal senses body odor. However, I have discovered that a primary odor sensed by an animal is breath odor of the hunter.

SUMMARY OF THE INVENTION

The aforesaid problem is solved by a hunting mask and breath odor control system that purifies breath prior to exhalation thereof. The mask comprises one way intake and exhalation valves with an air filter or canister therebetween. Exhaled air passes through the filter during breathing and is intermittently discharged to the atmosphere.

BRIEF DESCRIPTION OF THE DRAWING

FIG. 1 is a perspective view of the hunting mask and breath odor control system in operative position on the face of a hunter.

DETAILED DESCRIPTION OF A PREFERRED EMBODIMENT OF THE INVENTION

Referring to the drawing, a hunting mask 10 comprises a face mask 12 of conventional construction which is adapted to snugly fit the face of the hunter. A suitable resilient strap 13 maintains the mask 12 in position. The face mask 12 has a one-way inhalation valve 14 therein for the admission of ambient air to the mouth and nose of the hunter. A flexible exhalation tube 16 is connected to the face mask 12 which leads to an air purifying canister 18 containing, for example, charcoal granules. A suitable clip attaches the canister 18 internally or externally of the wearing apparel of the hunter. One advantage to attaching the canister 18 at the end of flexible tube 16 is that the canister 18 can be placed internally of the hunter's outer clothing whereby exhaled breath functions to warm the hunter's body.

A pair of one-way exhalation valves 20 and 21 are disposed at opposite ends of the canister 18 to control passage of purified breath to the atmosphere and preclude the back inhalation of breath from the canister 8, respectively.

In operation, normal breathing by the hunter draws ambient air through the valve 14 to the rear of the mask 12. Exhaled breath flows through the tube 16 and valve 20 to the canister 18 thence outwardly through the valve 21 to the ambient atmosphere.

While the preferred embodiment of the invention has been disclosed, it should be appreciated that the invention is susceptible of modification without departing from the scope of the following claims.

I claim:

1. A hunting mask for purifying the breath of a hunter prior to discharge to the ambient atmosphere comprising
   a face mask for disposition on the face of a hunter in sealed relation thereto,
   a one-way air intake valve on said face mask for admitting ambient air through said mask to the mouth and nose of a hunter but precluding exhaust of breath from behind said mask,
   an air purification canister,
   a breath discharge tube connected to said mask and to said canister in fluid flow relationship thereto for conducting a hunter's breath from said mask to an intake end of said canister, and
   a one-way discharge valve at the discharge end of said canister for discharging breath therefrom to the ambient atmosphere.

2. The mask of claim 1 including a second one way valve at the inlet end of said canister for admitting breath thereto.

* * * * *